June 18, 1940.          G. D. MAINARD          2,204,940
LEAF SPRING
Filed Dec. 1, 1938
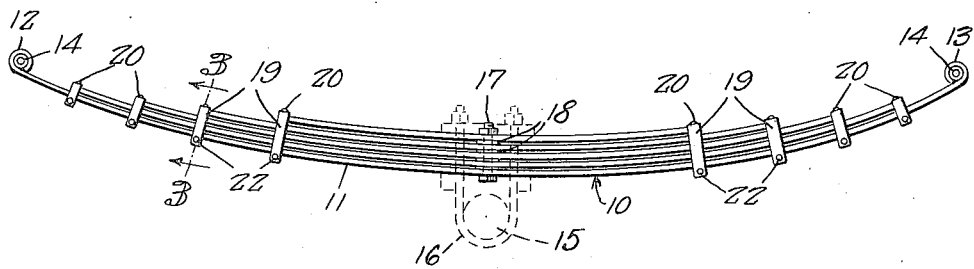
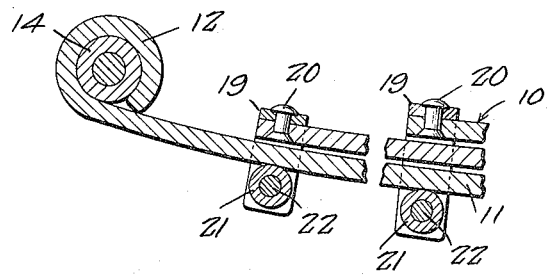   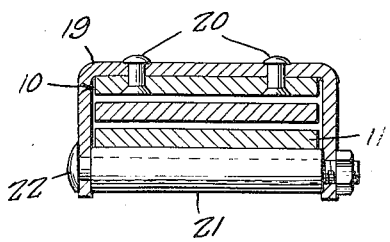
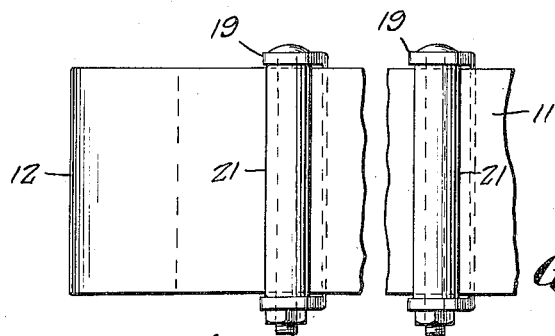
Gordon D. Mainard,
INVENTOR
BY Victor J. Evans & Co.
ATTORNEYS Patented June 18, 1940

2,204,940

UNITED STATES PATENT OFFICE 2,204,940

LEAF SPRING

Gordon D. Mainard, Mattoon, Ill.

Application December 1, 1938, Serial No. 243,426

5 Claims. (Cl. 267—47)

My invention relates to improvements in leaf springs to be used by automobile vehicles or the like.

An important object of my invention is to provide a leaf spring that is simple in construction, easy to manufacture and efficient in operation.

Another object of my invention is to provide a leaf spring that is more readily responsive to varying loads.

Yet another object of my invention is to provide a leaf spring adapted to reduce to a minimum the friction between the individual leaves comprising the spring.

Other objects and advantages of my invention will be apparent during the course of the following description.

In the accompanying drawing, forming part of this specification, and in which like numerals are employed to designate like parts throughout the same:

Figure 1 is a side elevation of a device embodying my invention.

Figure 2 is a fragmentary longitudinal sectional view of the same.

Figure 3 is a transverse sectional view taken on the line 3—3 of Figure 1, and

Figure 4 is a fragmentary bottom plan view of the leaf spring.

In the drawing, wherein for the purpose of illustration, is shown a preferred embodiment of my invention, the numeral 10 designates a plurality of superimposed resilient leaves, bowed slightly longitudinally and of gradually diminishing length from bottom to top, the lower leaf 11 being longer and is provided at its either end with suitable eyes 12 and 13 respectively, having sleeve members 14 carried therein for receiving shackles or the like by which the spring is attached to the body of a vehicle. The central portion being supported upon an axle housing 15 and secured thereon by means of a U-bolt 16.

The center bolt 17 passes through registering openings in the longitudinal and transverse centers of the several leaves and holds the said leaves against lateral displacement. Carried by the bolt 17 and disposed between the leaves 10 are washers or spacers 18 which maintain the leaves in fixed spaced relation and permits each leaf to flex independently of the others.

With the exception of the lowermost leaf 11, the superimposed leaves are provided adjacent their ends with inverted clevis members 19 secured thereon by means of rivets 20, the depending arms of the clevis members 19 embrace but do not engage the edges of the leaves 10 and gradually increase in length as they approach the transverse center of the spring in order to properly receive the increasing number of leaves therebetween, as illustrated in Figure 1 of the drawing. Each clevis adjacent its lower end has journaled between opposite portions thereof a roller 21 contacting the under face of the lowermost longer leaf 11. The roller 21 is carried by and securely held in place by the bolt 22.

The main leaf 11 is bowed longitudinally to a lesser extent than are the shorter leaves spaced above it, when the spring is assembled the ends of the shorter leaves are flexed toward the said main leaf 11 and securely held by means of the inverted clevis members 19, this also serves to hold the rollers 21 in close frictional engagement with the bottom face of the main leaf 11 thus insuring a rigid and yet highly flexible spring.

The unique construction of placing the main leaf 11 below the main portion of the spring, together with the spaced relation of the individual leaves permits each leaf a certain amount of individual resiliency independent of the others, but each is still able to transmit its resilient action to the remaining leaves through the medium of the rollers 21. This eliminates friction between the leaves caused by the longitudinal expansion of the leaves when a load is applied vertically thereon.

It can thus be seen that as an increasingly greater load is applied to the spring it will be absorbed by an increasing number of leaves, and that the rollers 21 will allow for the longitudinal expansion of the leaves, the position of the main portion of the spring above the main leaf 11 also allows the main portion of the spring to absorb the rebound shock when the applied load is suddenly released, thus greatly reducing the possibility of breakage.

It is to be understood that the form of my invention herewith shown and described is to be taken as a preferred example of the same, and that various changes in the size, shape, and arrangement of parts may be resorted to without departing from the spirit of my invention, or the scope of the sub-joined claims.

Having thus described my invention, I claim:

1. A vehicle leaf spring comprising the combination of a plurality of graduated leaves arranged in uniformly spaced relation one above the other, means at the ends of the longest of the leaves to secure the said spring to a vehicle, clevis members secured to the opposite ends of each leaf above the said longest leaf and adapted to embrace but not engage the opposite longitudinal edges of the subjacent leaves, a transversely positioned roller journaled between the depending arms of each of the said clevis members and held in close frictional engagement with the bottom face of the said longest leaf, the ends of the leaves above the longest leaf being unconstrained except through the medium of the rollers, a bolt passing through registering openings in the several leaves intermediate their ends, and spacers carried by the said bolt arranged between the leaves and functioning to maintain the same in spaced relation with each other.

2. A vehicle leaf spring comprising the combination of a plurality of graduated leaves arranged in uniformly spaced relation one above the other, clevis members secured to the opposite ends of each leaf above the longest of the leaves and adapted to embrace but not contact the opposite longitudinal edges of the subjacent leaves, a transversely positioned roller carried by each of the clevis members and engaging the bottom face of the said longest leaf, the ends of the leaves above the longest leaf being unconstrained except through the medium of the rollers, a bolt passing through registering openings in the several leaves and functioning to hold the same against longitudinal displacement, and means to maintain the said leaves in fixed spaced relation with each other.

3. A vehicle leaf spring comprising the combination of a plurality of graduated leaves arranged in uniformly spaced relation one above the other, spring straddling clips secured to the ends of each leaf above the longest of the leaves, transversely positioned rollers carried by the clips at the open end thereof and engaging the bottom face of the longest leaf, the ends of the leaves above the longest leaf being unconstrained except through the medium of the rollers.

4. In a leaf spring construction of the type wherein a plurality of longitudinally bowed leaves are arranged in spaced relation one above the other, the lowermost leaf being longer and each of the leaves thereabove being of progressively diminishing length, the improvement comprising a roller member carried by each end of the leaves spaced above the lowermost leaf, each of the said rollers having an exclusive engagement with the bottom face of the said longer lowermost leaf, and the ends of the leaves above the lowermost leaf being unconstrained except through the medium of the rollers.

5. In a leaf spring construction of the type wherein a plurality of longitudinally bowed leaves are arranged in spaced relation one above the other, the lowermost leaf being longer and each of the leaves thereabove being of progressively diminishing length, the improvement comprising clevis members secured to the ends of each of the leaves spaced above the longer lowermost leaf, said members being adapted to embrace but not engage the longitudinal edges of the lower and intermediate leaves, and a roller journaled between the arms of each of the clevis members and engaging the bottom face of the said longer lowermost leaf, the ends of the leaves above the lowermost leaf being unconstrained except through the medium of the rollers.

GORDON D. MAINARD.